United States Patent
Benkreira et al.

(10) Patent No.: US 12,051,071 B2
(45) Date of Patent: Jul. 30, 2024

(54) SYSTEM, METHOD AND COMPUTER-ACCESSIBLE MEDIUM FOR IMPAIRED MODE SPEND PROTECTION

(71) Applicant: Capital One Services, LLC, McLean, VA (US)

(72) Inventors: Abdelkader Benkreira, Washington, DC (US); Joshua Edwards, Philadelphia, PA (US); Adam Vukich, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 680 days.

(21) Appl. No.: 17/003,241

(22) Filed: Aug. 26, 2020

(65) Prior Publication Data
US 2022/0067741 A1 Mar. 3, 2022

(51) Int. Cl.
*G06Q 20/40* (2012.01)
*G06V 10/143* (2022.01)

(52) U.S. Cl.
CPC ..... *G06Q 20/40145* (2013.01); *G06V 10/143* (2022.01)

(58) Field of Classification Search
CPC .......... G06Q 20/40145; G06V 40/197; G06V 40/174; G06V 10/143; G06N 20/00; G06F 3/011; G06F 3/013; G06F 3/02; G06F 3/167; G06F 2203/011
USPC .................................................... 705/35–45
See application file for complete search history.

(56) References Cited

U.S. PATENT DOCUMENTS

| | | | |
|---|---|---|---|
| 8,396,935 B1 | 3/2013 | Ciurumelea et al. | |
| 8,666,829 B1 | 3/2014 | Bruckhaus | |
| 8,983,868 B1 | 3/2015 | Sehrer | |
| 9,614,844 B2 | 4/2017 | Turner et al. | |
| 9,619,852 B2 | 4/2017 | Dutt et al. | |
| 2002/0112177 A1* | 8/2002 | Voltmer | G07C 9/37 726/26 |
| 2003/0172036 A1 | 9/2003 | Feigenbaum | |
| 2007/0180263 A1* | 8/2007 | Delgrosso | G06F 21/32 713/186 |
| 2010/0153707 A1 | 6/2010 | Lentz | |
| 2013/0024338 A1 | 1/2013 | Nielson et al. | |
| 2013/0110715 A1 | 5/2013 | Buchhop | |

(Continued)

OTHER PUBLICATIONS

Google Scholar Search, dated May 20, 2022 (Year: 2022).*
Google Patents Search, dated May 20, 2022 (Year: 2022).*

*Primary Examiner* — Hai Tran
(74) *Attorney, Agent, or Firm* — HUNTON ANDREWS KURTH LLP

(57) ABSTRACT

An exemplary system, method, and computer-accessible medium for denying a financial transaction(s) initiated by a customer(s) can include receiving information related to the financial transaction(s), determining a transaction impairment(s) associated with the customer(s), and denying the financial transaction(s) based on the transaction limitation. The transaction impairment(s) can be a particular time period, and the computer arrangement can be configured to deny the transaction(s) if the transaction(s) is initiated within the particular time period. The particular time period can be received from the user(s). The transaction impairment(s) can be an impairment of the customer(s). The transaction impairment(s) can include a cognitive impairment.

20 Claims, 10 Drawing Sheets

(56) References Cited

U.S. PATENT DOCUMENTS

| | | | |
|---|---|---|---|
| 2013/0144784 A1 | 6/2013 | Yang et al. | |
| 2014/0114877 A1 | 4/2014 | Montano | |
| 2014/0233855 A1 | 8/2014 | Clarke | |
| 2014/0279379 A1 | 9/2014 | Mahdi et al. | |
| 2014/0358741 A1 | 12/2014 | Howe | |
| 2015/0046216 A1 | 2/2015 | Adjaoute | |
| 2015/0095247 A1 | 4/2015 | Duan | |
| 2015/0120572 A1 | 4/2015 | Slade | |
| 2015/0161620 A1 | 6/2015 | Christner | |
| 2015/0348219 A1 | 12/2015 | Unser et al. | |
| 2015/0379517 A1 | 12/2015 | Jin et al. | |
| 2016/0189159 A1 | 6/2016 | Luk et al. | |
| 2016/0292687 A1 | 10/2016 | Kruglick | |
| 2016/0321721 A1 | 11/2016 | Stein | |
| 2016/0335640 A1 | 11/2016 | Howe et al. | |
| 2017/0049373 A1* | 2/2017 | Jahnke | A61B 5/4088 |
| 2017/0193513 A1 | 7/2017 | Zand-Biglari | |
| 2021/0056556 A1* | 2/2021 | Matsunaga | H04L 63/0861 |

* cited by examiner

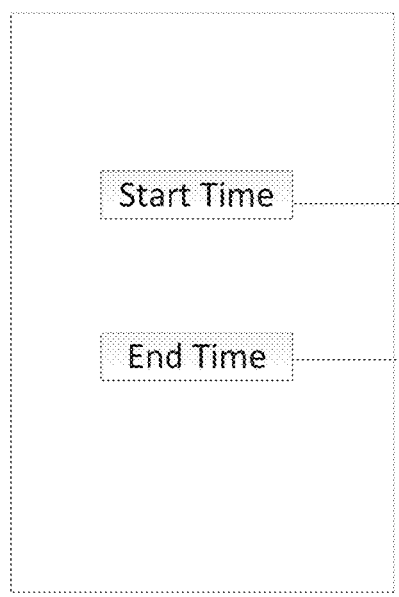 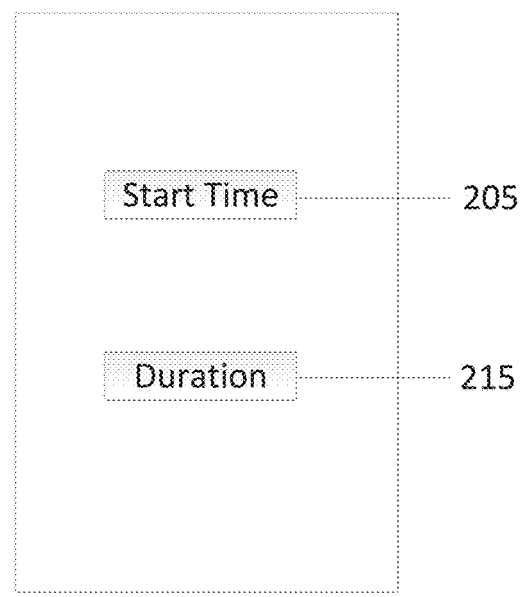
Figure 2A
Figure 2B

SYSTEM, METHOD AND COMPUTER-ACCESSIBLE MEDIUM FOR IMPAIRED MODE SPEND PROTECTION

FIELD OF THE DISCLOSURE

The present disclosure relates generally to spend protection, and more specifically, to exemplary embodiments of an exemplary system, method and computer-accessible medium for impaired mode spend protection.

BACKGROUND INFORMATION

With the advent of e-commerce and mobile purchasing, it is easier than ever to make a purchase. Whether it be inexpensive purchases such as food delivery, or expensive purchases such as electronics, customers can easily make purchases using a mobile device or a computer. This greatly benefits consumers, as the purchasing processing is easy and seamless. This also greatly benefits merchants, as users can more easily make impulse purchases, which would otherwise not be possible. However, in certain circumstances, the ability to easily make a purchase can be detrimental. For example, if a customer is somehow impaired (e.g., consumed too much alcohol, has done drugs, has a mental disorder, or has some other mental impairment), the customer may be more likely to make purchases that they will regret when they are no longer impaired. However, since purchasing has become so easy, there is currently no easy and convenient way to prevent customers from making purchases while in an impaired state.

Thus, it may be beneficial to provide an exemplary system, method and computer-accessible medium for impaired mode spend protection, which can overcome at least some of the deficiencies described herein above.

SUMMARY OF EXEMPLARY EMBODIMENTS

An exemplary system, method, and computer-accessible medium for denying a financial transaction(s) initiated by a customer(s) can include determining a baseline biological function for the customer(s), receiving information related to the at least one financial transaction, receiving current biological information from the customer, determining an impairment for the customer by comparing the baseline biological function to the current biological information, denying the financial transaction(s) based on the impairment. The transaction can be automatically denied if the transaction(s) is initiated within the particular time period. The particular time period can be received from the customer(s). The transaction impairment(s) can be an impairment of the customer(s). The baseline biological function can be baseline cognitive function and the current biological information can be a current cognitive function of the customer(s).

The baseline cognitive information can be determined using a machine learning procedure(s). The baseline cognitive information can be determined based on an input(s) into a computing device from the customer(s). The input(s) can include a textual input, a tactile input, a vocal input, or a cursor input from of at least one of a mouse or a trackpad. The textual input can be from a keyboard. The transaction impairment(s) can be determined based on a movement of an eye associated with the customer(s). The baseline biological function can relate to a movement of an eye associated with the customer(s). The baseline biological function can be generated using an infrared camera. The baseline biological function can be related to motor skills of the customer(s). Information related to the financial transaction(s) can be provided to the customer(s) after the impairment(s) has ended, and the financial transaction(s) can be initiated based on an approval from the customer(s). The financial transaction(s) can be denied if the financial transaction(s) is over a particular amount. The financial transaction(s) can be a card not present financial transaction(s).

Additionally, an exemplary system, method, and computer-accessible medium for determining that a customer(s) can be impaired can include, receiving a first input(s) from the customer(s) during a first period of time where the customer(s) is not impaired, determining a first cognitive function associated with the customer(s) based on the input(s), receiving a second input(s) from the customer(s) during a second time period, where the second time period is different from the first time period, determining a second cognitive function associated with the customer(s) based on the second input(s), and determining that the customer(s) can be impaired by comparing the second cognitive function with the first cognitive function. A financial transaction(s) can be denied if the financial transaction(s) is initiated by the customer(s) that is determined to be impaired. The financial transaction(s) can be denied only if the financial transaction(s) is over a particular amount. The first cognitive function associated with the customer(s) can be determined based on the first input using a machine learning procedure(s). The first input(s) can include a textual input, a tactile input, a vocal input, or a cursor input from of a mouse or a trackpad.

An exemplary system for denying a financial transaction(s) initiated by a customer(s) can include an infrared light source configured to generate a first infrared light and provide the first infrared light to an eye(s) of the customer(s), an infrared camera configured to receive a reflected infrared light from the eye(s) that is based on the first infrared light, and a computing arrangement configured to receive eye tracking information from the infrared camera, determine a baseline eye information based on the eye tracking information, compare the baseline eye information to a predetermined eye information stored in a database, and deny the financial transaction(s) if the baseline eye information does not substantially match the predetermined eye information.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 2A and 2B are exemplary diagrams illustrating setting up time periods to prevent spending according to an exemplary embodiment of the present disclosure;

DETAILED DESCRIPTION OF EXEMPLARY EMBODIMENTS

The exemplary system, method, and computer-accessible medium, according to an exemplary embodiment of the present disclosure, can be used to prevent a customer from making a purchase in an impaired state. The customer can voluntarily install an application, or enable a feature on a technological device (e.g., smartphone, tablet, laptop, desktop, etc.), which can prevent the customer from making unwanted purchases in an impaired state, and thus preventing the customer from having buyer's remorse.

Figure 1:
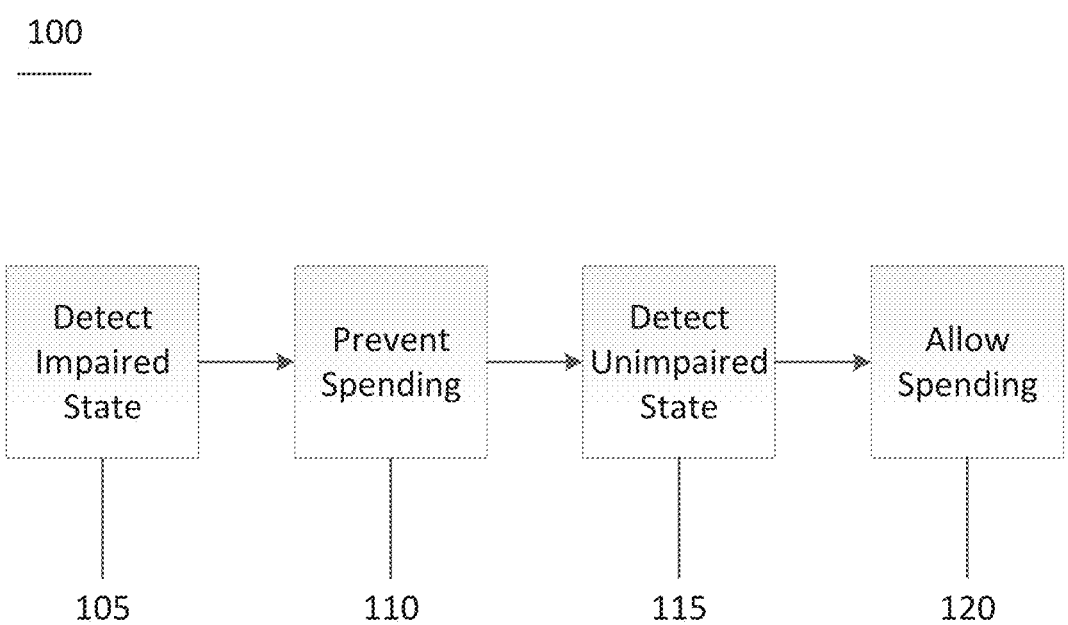
FIG. 1 is an exemplary flow diagram of a method for determining an impaired mode and preventing spending according to an exemplary embodiment of the present disclosure.

As illustrated in method 100 shown in FIG. 1, in order to prevent purchases when a user (e.g., customer) is in an impaired state, the exemplary system, method and computer-accessible medium can detect an impaired state of the user (e.g., Element 105), and prevent the user from being able to make purchases while in the impaired state (e.g., Element 110). The exemplary system, method and computer-accessible medium can predict the impaired state of the user (e.g., determine that the user is in the impaired state) to control the spending of the user. Controlling of spending can include denying any transaction, denying transactions above a certain amount (which can be set by the user when in a non-impaired state), or denying transactions at particular merchants (which can be set by the user in a non-impaired state). Once the exemplary system, method and computer-accessible medium detects that the user is no longer in the impaired state (e.g., Element 115), for example after the exemplary system, method and computer-accessible medium detects that the user is no longer in the impaired state, or after a particular amount of time has lapsed, then spending by the user can be allowed (e.g., Element 120).

As described herein, an impaired state can include, but is not limited to, being drunk from consuming too much alcohol, being high from consuming drugs, having a mental disorder that includes lucid and non-lucid states, sleep deprivation, or any other state of impairment of the user.

For example, if a user is sleep deprived, they can be more likely to make impulse purchases. In such an example, the exemplary system, method, and computer-accessible medium can deny certain purchases that take place within a particular period of time. Specifically, a time interval can be set by the user where purchases can be restricted. As shown in FIG. 2A, user can set Start Time 205 and any End Time 210 (e.g., start at 11:00 pm and end at 6:00 am), or Start Time 205 can be set with Duration 215 (e.g., start at 11:00 pm and go for 7 hours). Any purchases within this time can be restricted as described above. Once the time interval has lapsed, the exemplary system, method, and computer-accessible medium can remove purchasing restrictions, and allow all purchases to occur.

The restriction interval can be set by the user prior to the exemplary system, method, and computer-accessible medium implementing any restrictions. The user can activate impaired mode spending restrictions, and set a particular time period for the restrictions. As discussed above, a start time and end time can be provided, or a start time and duration can be provided. The user can also set different time periods based on different days. For example, one time period can be used Sunday night through Thursday night and a different time period can be set for Friday night and Saturday night. Additionally, time periods can change depending on holidays where the user may be off from work, as well as vacations set by the user. The exemplary system, method and computer-accessible medium, according to an exemplary embodiment of the present disclosure, can also automatically set the time period based on other users (e.g., based on when other users set their time period, or based on the information from multiple users). Additionally, the exemplary system, method and computer-accessible medium can analyze various information about the sleep patterns of users, and when users are more likely to be impaired (e.g., based on national data, or studies published online) to automatically set a time period. The automatically set time period can also override the user set time period. Thus, for example, if the user sets a time period of only 4 hours, the exemplary system, method, and computer-accessible medium can override this time period and set it for longer based on the information described above. However, the user can also override the automatically set time period. For example, the user can be provided with a prompt that the automatically set time period is about to start. The user can delay the start of the automatically set time period (e.g., the user can "snooze" the time period), or the user can cancel the automatically set time period. IF the user cancels the automatically set time period, the cancellation may only take effect for this instance (e.g., the automatically set time period will still activate at the next scheduled time).

Figure 3:
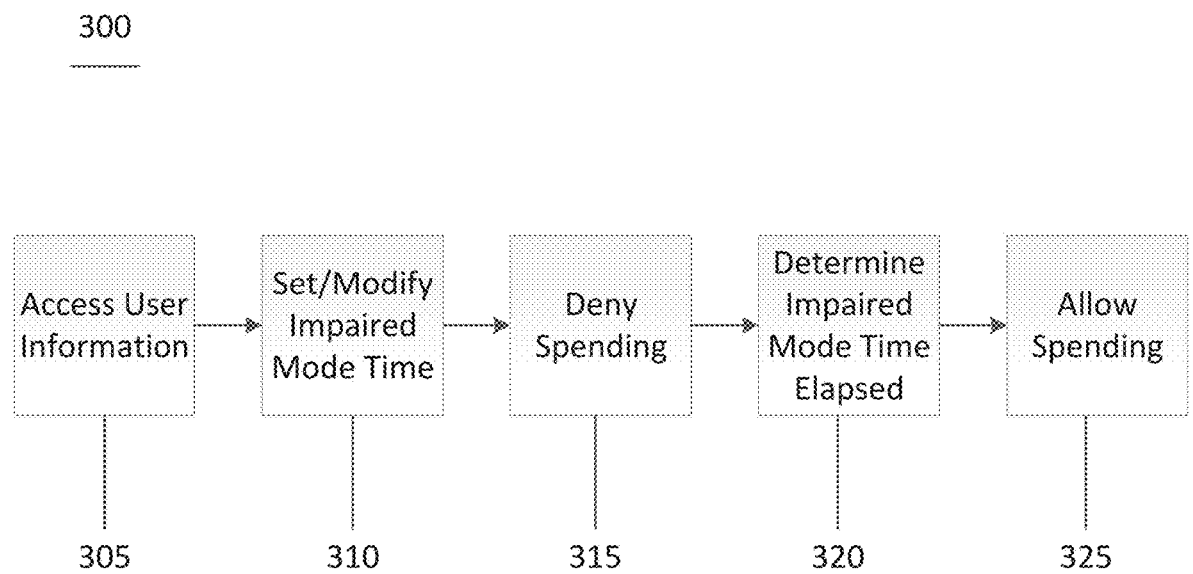
FIG. 3 is an exemplary flow diagram of a method for accessing user information in order to automatically set an impaired mode time period according to an exemplary embodiment of the present disclosure.

As illustrated in the method 300 shown in FIG. 3, the exemplary system, method, and computer-accessible medium, according to an exemplary embodiment of the present disclosure, can automatically adjust the time period based on information contained in email or a calendar of the user. For example, the exemplary system, method, and computer-accessible medium can access the user's information at procedure 305, which can include scanning the user's calendar for information regarding upcoming appointments. If an upcoming appointment is detected that is early in the morning, and may be within the restricted time period, the exemplary system, method and computer-accessible medium can automatically modify the time period (e.g., at procedure 310) for the particular day based on the appointment. During this time period, at procedure 315, spending by the user can be denied. For example, if the timer period normally expires at 8:00 am, but the exemplary system, method and computer-accessible medium detects an appointment at 7:00 am, then the time period can be modified based on the appointment time. Modifications can include ending the time period at the time of the appointment, or prior to the appointment to account for the user having to wake up and prepare for the appointment (e.g., shower, get dressed, eat breakfast, etc.) Additionally, if the exemplary system, method, and computer-accessible medium detects plans taking place during the evening, then the time period can be updated based on the time the plans are taking place and the type of plans. For example, if the plans are not likely to cause an impairment (e.g., are not likely to involve drinking or drugs), then the time period can be adjusted based on an approximate time of the end of the plans, or a reasonable amount of time after). However, if the plans involve an activity that is likely to cause an impairment, then the time period can be automatically set to start after a certain amount of time after the plans being (e.g., when the user is likely to be impaired). After the impaired mode time period is determined to have elapsed at procedure 320, spending by the user can be allowed at procedure 325.

The exemplary system, method, and computer-accessible medium can also adjust the time period based on an upcoming vacation. This information can be detected based on the calendar or email of the user. The exemplary system, method, and computer-accessible medium can determine the type of vacation and the duration of the vacation to automatically update the time period. For example, the exemplary system, method, and computer-accessible medium can modify the time period to start later and/or end later based on the user being on vacation, regardless of the type of vacation. Additionally, the exemplary system, method and computer-accessible medium can determine whether or not the vacation is likely to lead to an impairment (e.g., does the vacation involve drinking), and can modify the time period to a different time period depending on whether or not the vacation is likely to lead to an impairment.

Figure 4A:
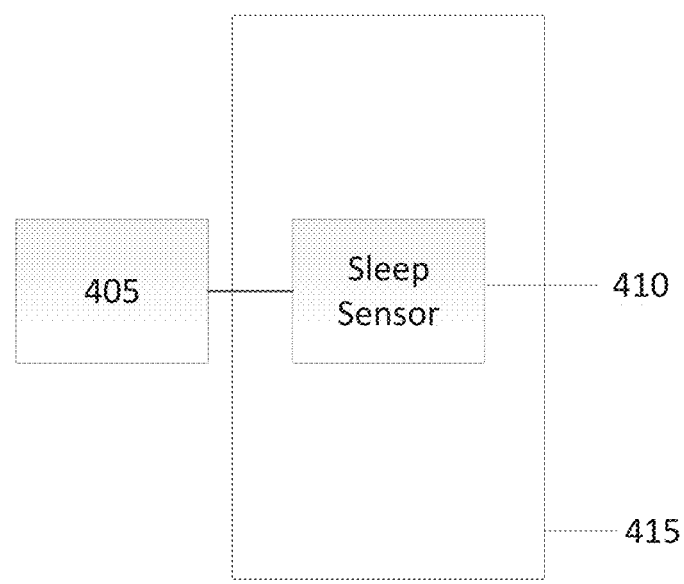
FIG. 4A is a schematic diagram of a device for tracking sleep according to an exemplary embodiment of the present disclosure.
Figure 4B:
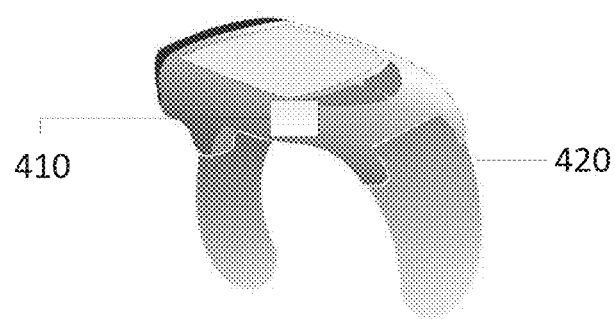
FIG. 4B is a diagram of a smart watch according to an exemplary embodiment of the present disclosure.

As shown in FIG. 4, the exemplary system, method, and computer-accessible medium (e.g., represented by element 405) can also track the sleep of the user to determine the time period. For example, the exemplary system, method and computer-accessible medium 405 can determine when the user stops operating a mobile device at night, and when the user begins to operate the mobile in the morning, to determine a sleep time. Multiple days can be used to generate the time period, which can be constantly updated on a daily basis. Additionally, the exemplary system, method, and computer-accessible medium 405 can analyze sleep patterns based on information obtained from Sleep Sensor 410, to determine when the user sleeps and when the user is awake. The exemplary system, method and computer-accessible medium 405 can then update the time interval accordingly. For example, the exemplary system, method and computer-accessible medium 405 can interface with a Wearable Device 415, which can include a smart watch, a sleep sensor, or any other wearable device capable of, or configured to, monitor sleep patterns of the user. For example, as shown in FIG. 4B, Wearable Device 415 can include a Smart Watch 420 having a Sleep Sensor 410 used to detect and/or analyze the sleep patterns of the wearer of the device. Wearable Device 415 can provide sleep information based on Sensors 410 contained within Wearable Device 415. Various other suitable sleep sensors can be used, for example, electrodes placed on the user to determine sleep patterns. Additionally, a mobile device, which includes the exemplary system, method, and computer-accessible medium thereon, can be placed on the bed of the user to automatically track the movement of the user at night to determine when the user sleeps and when the user is awake, in order to update the time period.

The exemplary system, method, and computer-accessible medium, according to an exemplary embodiment of the present disclosure, can be used to prevent purchases if the user is in an impaired state. The exemplary system, method, and computer-accessible medium can also prevent the user from overriding the impaired mode restrictions. For example, if it was easy for the user to override the impaired mode restrictions, then there would be no point to having the impaired mode. Thus, the restrictions for the particular time can be maintained unless certain conditions are met. For example, a user can contact a person associated with the exemplary system, method and computer-accessible medium (e.g., the owner of the app or the financial institution that put the restrictions in place) to remove the restrictions. The contacted person can require certain information from the user in order to remove the restrictions (e.g., answers to certain questions which can be automatically generated by the exemplary system, method, and computer-accessible medium, or which can be provided by the user when the user is not in the impaired state).

The exemplary system, method, and computer-accessible medium can also determine a change in biological function (e.g., cognitive, motor skills, eye movement) of the user, which can be based on a machine learning procedure as described below. For example, software can be installed (e.g., an app on a phone, an application on a computer, a browser extension, etc.), which can be used to track the input of the user or the motor skills of the user. Additionally, a custom keyboard can be used, which can examine how the user uses the keyboard (e.g., number of words typed in a particular period of time, number of typos). Information including the number of typos, how often the user has a typo, how and when nonsense is typed (e.g., the user types incoherently) can be used to determine the user's baseline cognitive skill, which can be obtained from a textual input, a tactile input, a vocal input, or a cursor input from at least one of a mouse or a trackpad. Further input by the user can be compared to the user's baseline to determine if the user is impaired. For example, an increased number of typos, or a decrease in the number of words typed in a particular period of time can indicate that the user is impaired. Additionally, typing incoherently can indicate that the user is impaired. Thresholds can be generated in order to determine if the user is impaired. For example, the exemplary system, method, and computer-accessible medium can allow for a certain amount of deviation from the user's baseline before the exemplary system, method and computer-accessible medium determines that the user is impaired. Different thresholds can be set for different metrics (e.g., different thresholds can be set for number of typos, number of words typed per minute, etc.). The exemplary system, method, and computer-accessible medium can separately track each metric and compare it to the thresholds, or the deviations, from the user's baseline when determining a user's impairment. The exemplary system, method and computer-accessible medium, according to an exemplary embodiment of the present disclosure, can track all input by the user into the device (e.g., text message input, email input, web browsing input) in order to determine a user's impairment. Additionally, thresholds can be adjusted based on the activity being performed by the user (e.g., is the user home alone, is the user out at a bar/restaurant). As discussed above, this information can be gathered based on the user's email and/or calendar.

Exemplary thresholds can be determined using a machine learning procedure and/or statistical procedure in order to determine standard ranges of various factors. Exemplary categorization procedures can be used to determine whether or not text input from a user matches their normal behavior. When utilizing a statistical procedure, typical range of inputs can be determined, and then the exemplary system, method, and computer-accessible medium can determine any input that occurs outside of the typical. Additionally, the exemplary system, method, and computer-accessible medium determine whether or not the inputs occurs significantly out of the range (e.g., a full standard deviation away). The user can also provide input as to times that they were impaired, and then the exemplary system, method and computer-accessible medium can compare the inputs received during the times that they were impaired to other times when the user was not impaired to determine any differences, as well as which inputs can be most useful for observing an impairment in the future. Thresholds can then be based on the differences in the observations.

The exemplary system, method, and computer-accessible medium, according to an exemplary embodiment of the present disclosure, can also determine the threshold based on multiple users. Input from a large number of users can be provided, and the exemplary system, method, and computer-accessible medium can determine the mean difference between impaired and non-impaired inputs. Ranges of differences can be identified to capture a certain percentage of users. For instance, if a 10+% increase in typos is observed in 95% of users when they are impaired, then the thresholds can be set to, for example, 10%.

Various information can be used by the exemplary system, method, and computer-accessible medium in order to determine whether or not the user is impaired. For example, how quickly the user normally types, how many times the user presses backspace or delete, and normal word spellings by the user (e.g., the exemplary system, method and computer-accessible medium can have information on which words, types of words, or letter combinations, the user normally misspells even when not impaired). The exemplary system, method, and computer-accessible medium can also determine that the user is typing drastically slower than normal. It can be possible that the user has the same accuracy, but needs to type slower in order to obtain the same level of accuracy as the user's baseline. This can indicate an impairment. An impairment can also be based on whether the user is suddenly having to use the backspace or delete keys more often, whether they are typing incorrectly two to three times slower than normal. It can also be based on the frequency of misspellings (e.g., how often a word is misspelled), or the number of words misspelled as compared to the number of words spelled correctly (e.g., normally the user has every seventh word auto-corrected, but suddenly the user has every third word auto-corrected). The frequency of acronyms used can indicate an impairment (e.g., the user suddenly uses more acronyms than normal can indicate that the user is unable to type with the same accuracy, and must use the acronym). Additionally, the use of emojis can be tracked. For example, how often a user uses emojis during their baseline versus when impaired, or the types of emojis used during their baseline versus when impaired. The specific text typed by the user can also indicate an impairment. For example, the exemplary system, method, and computer-accessible medium can monitor text messages and emails to determine if the user informs another person of their mental status (e.g., the user texts a friend "I am so drunk right now"). Responses from the people communicating with the user can also be monitored for any information on the state of the user (e.g., a person texting the user "We are at the bar, come and meet us").

The exemplary system, method, and computer-accessible medium can utilize Natural Language Processing ("NLP") in order to examine the input by the user (e.g., the user's texts, emails, etc.). NLP facilitates a computer to understand, interpret, and manipulate human language. The exemplary system, method, and computer-accessible medium, according to an exemplary embodiment of the present disclosure, can utilize NLP to read text, hear speech, interpret it, measure sentiment, and determine which parts are important. The exemplary system, method, and computer-accessible medium, according to an exemplary embodiment of the present disclosure, can access one or more databases, depending on the language of the user, in order to facilitate processing of the input by the user. The exemplary system, method, and computer-accessible medium can utilize synonym matching to find all the different ways that a user can say that same thing.

Figure 5:
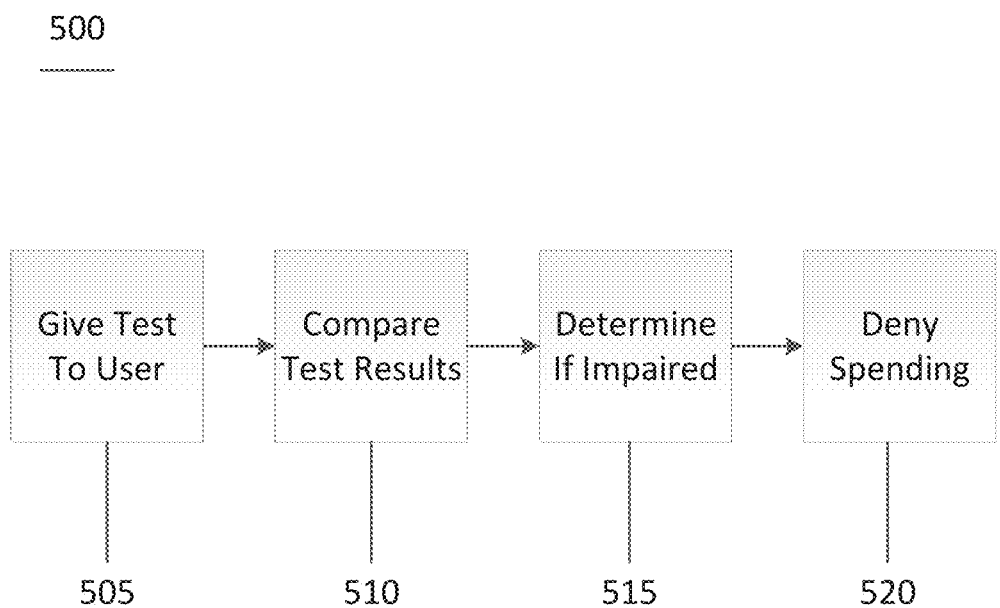
FIG. 5 is an exemplary flow diagram of a method for determining if a user is impaired by testing the user according to an exemplary embodiment of the present disclosure.

As illustrated in method 500 shown in FIG. 5, the exemplary system, method and computer-accessible medium can also determine an impairment based on a test given to the user. The test can be pregenerated, and can be used to determine the cognitive impairment of the user. The test can be a standard test given to multiple users. The test can then be given to the particular user at procedure 505, and the results can be compared to a previous test taken by the user in an unimpaired state, or to other users, at procedure 510. Depending on how well the user performed on the test, an impairment can be determined at procedure 515. Additionally, the test, a similar test, or a series of tests, can be given to the user in an unimpaired state to obtain a baseline for the user. The test can then be given at a later time, the results of which can be compared to the user's baseline in order to determine if the user is impaired. The test can change at regular intervals in order to prevent the user from being able to pass the test (e.g., by having taken it multiple times) even while impaired. The test can include, but is not limited to, solving a math problem or a memory test, etc. If the exemplary system, method, and computer-accessible medium determines that the user is impaired at procedure 515, then spending can be denied at procedure 520.

Figure 6:
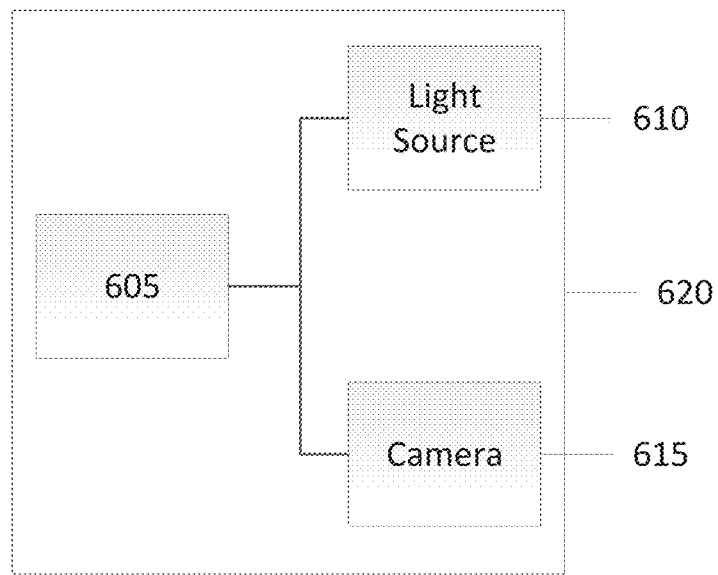
FIG. 6 is a schematic diagram of a system for tracking eye movement according to an exemplary embodiment of the present disclosure.

The exemplary system, method and computer-accessible medium (as shown be element 605 from FIG. 6) can determine an impairment based on an analysis of an eye of the user (e.g., an eye movement). The exemplary system, method and computer-accessible medium 605 can interface with Light Source 610 (e.g., an infrared light source) and Camera 615 (e.g., an infrared camera), which can be used to determine certain information about the user's eye (e.g., eye movement, pupil dilation, etc.). This information can be compared to baseline eye information obtained from the user when not impaired in order to determine if the user is impaired. The information can be obtained from one or both eyes of the user. Light Source 610 and Camera 615 can be built into Device 620 (e.g., a mobile device) that runs the exemplary system, method, and computer-accessible medium 605, or Light Source 610 and Camera 615 can be external devices that can be communicated with. Communication can be wired and wireless communication, and includes, but is not limited to, Wi-Fi, Bluetooth, Ethernet, RS-232, USB, etc.).

After an impairment is detected by the exemplary system, method, and computer-accessible medium, impaired mode restrictions (e.g., rules) can be initiated. All transactions from the user can be blocked, which can include card present transactions and card not present transactions. All transactions above a particular amount, which can be preset by the user, can be denied. All card present transactions can be allowed, while all card not present transactions can be denied. All card present transactions can be allowed, while card not present transactions above a certain amount can be denied. Various combinations of the above can be used when determining which transactions to allow or deny. Additionally, the restriction can be based on the type of merchant being transacted with. For example, transactions at restaurants or at food service merchants, regardless of the amount, can be allowed, while all other transactions can be denied. Additionally, transactions at transportation merchants (e.g., taxis, buses, trains, car services, etc.) can be allowed regardless of the amount, while denying all or some of the other transactions (e.g., also allowing transactions at restaurants). Additionally, certain merchants can be denied while allowing all other transactions at other merchants. For example, the user can select particular merchants for which to deny any transaction, regardless of the amount. The user can also select merchant types (e.g., electronics, travel, excursions, etc.) for which to deny all transactions, regardless of the amount.

The exemplary system, method, and computer-accessible medium can also examine the user's transaction history to determine recurring transactions. If a previous recurring transaction is initiated within the time period, the exemplary system, method and computer-accessible medium can allow this transaction to occur. For example, if the user has one or more monthly subscriptions (e.g., cell phone, video service, insurance payment, etc.), the exemplary system, method, and computer-accessible medium may not deny these transactions, since they are predetermined monthly transactions. The user can also manually add whitelists of certain merchants to always allow transactions (e.g., the user can specify the monthly subscriptions or the user can specify a food delivery service they often order from when in the impaired state).

The exemplary system, method and computer-accessible medium can also identify specific transactions that the user appears to be initiating, for example, based on a browser extension or app (e.g., commerce app) being monitored. These potential transactions can be denied, but information regarding the transaction can be saved by the exemplary system, method, and computer-accessible medium. Once the user is no longer impaired (e.g., based on the time period expiring or the exemplary system, method and computer-accessible medium determining that the user is no longer impaired) information regarding the user's purchase attempts can be provided to the user. If a transaction was denied while the user was impaired, the exemplary system, method, and computer-accessible medium can provide information regarding the transaction when the user is no longer impaired. The user can then make a determination, when in an unimpaired state, as to whether or not they really want to initiate a transaction. For example, if the user attempted to buy clothes when in an impaired state, the exemplary system, method and computer-accessible medium can keep track of the merchant and all of the specific clothes the user attempted to purchase, but which was denied by the exemplary system, method, and computer-accessible medium. Information regarding the clothes, which can include links to all of the clothes, can be provided to the user when the user is no longer in the impaired state for the user to purchase when not in the impaired state.

Transactions can be denied at a system level of the device being used. For example, an app can be installed that will prevent the user from even initiating the transaction in the first place. This can place system-wide restrictions on all transactions taking place on the device. However, in such a scenario, the user may be able to use a different device in order to initiate the purchase. In order to overcome this, the app or browser extension can be installed on multiple devices. Thus, the user cannot simply use another one of their devices to initiate the transaction. However, if the app is not installed on a particular device, the user may still be able to initiate the transaction on that device. In order to prevent transactions on the specific device, or other devices, the transactions can be denied by the financial account being used to make the purchase. For example, the restrictions can be put in place on a particular financial account (e.g., credit card) that is associated with the user. When a user initiates a transaction, the system can allow the transaction to take place, but the financial institution associated with the financial account can deny the transaction. Thus, regardless of the device being used, the transaction will always be denied, subject to the description above. By implementing system-wide restrictions for a single device, and financial account restrictions, almost all transactions initiated by the user can be denied.

The exemplary system, method, and computer-accessible medium can have a single restriction level, which can be activated based on the detection of an impairment. However, different restriction levels can be incorporated depending on the detected impairment. For example, one restriction level can be to deny all transaction unless below a particular amount (e.g., $20). This can be activated based on a particular impairment level (e.g., the user being drunk or high, or unable to pass a particular test). A second restriction level can be to allow transactions below $40. This can be based on a determination of a lesser impairment level by the user (e.g., only slightly "buzzed" or slightly sleep deprived). Various restriction levels can be implemented automatically by the exemplary system, method and computer-accessible medium, or setup by the user, which can be based on different impairment levels.

Exemplary Machine Learning

The exemplary system, method, and computer-accessible medium can utilize machine learning to determine sleep patterns of one or more users in order to set the time period. Data from various sleep sensors that can detect sleep patterns of the particular user, and other users, can be analyzed in order to determine sleep patterns, which can be applied to the specific user. Additionally information regarding the impairment of other users, as described above, can be analyzed and applied to a particular user. For example, eye tracking information, cognitive information, and other suitable parameters can be tracked and analyzed in order to determine if a particular user is impaired.

The exemplary system, method, and computer-accessible medium can utilize various neural networks, such as convolutional neural networks ("CNN") or recurrent neural networks ("RNN") to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

Figure 7:
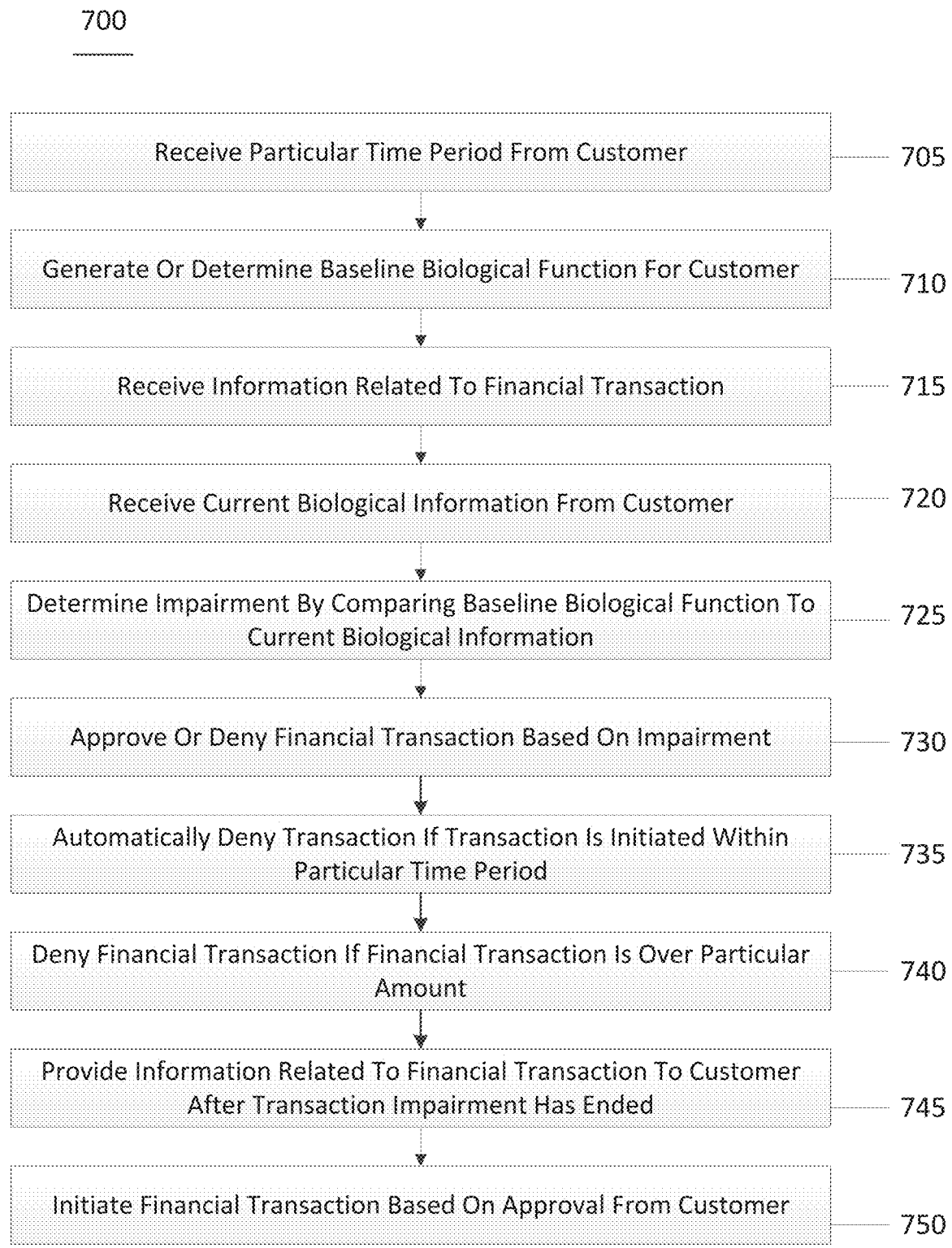
FIGS. 7-9 are flow diagrams of methods according to an exemplary embodiment of the present disclosure.
Figure 8:
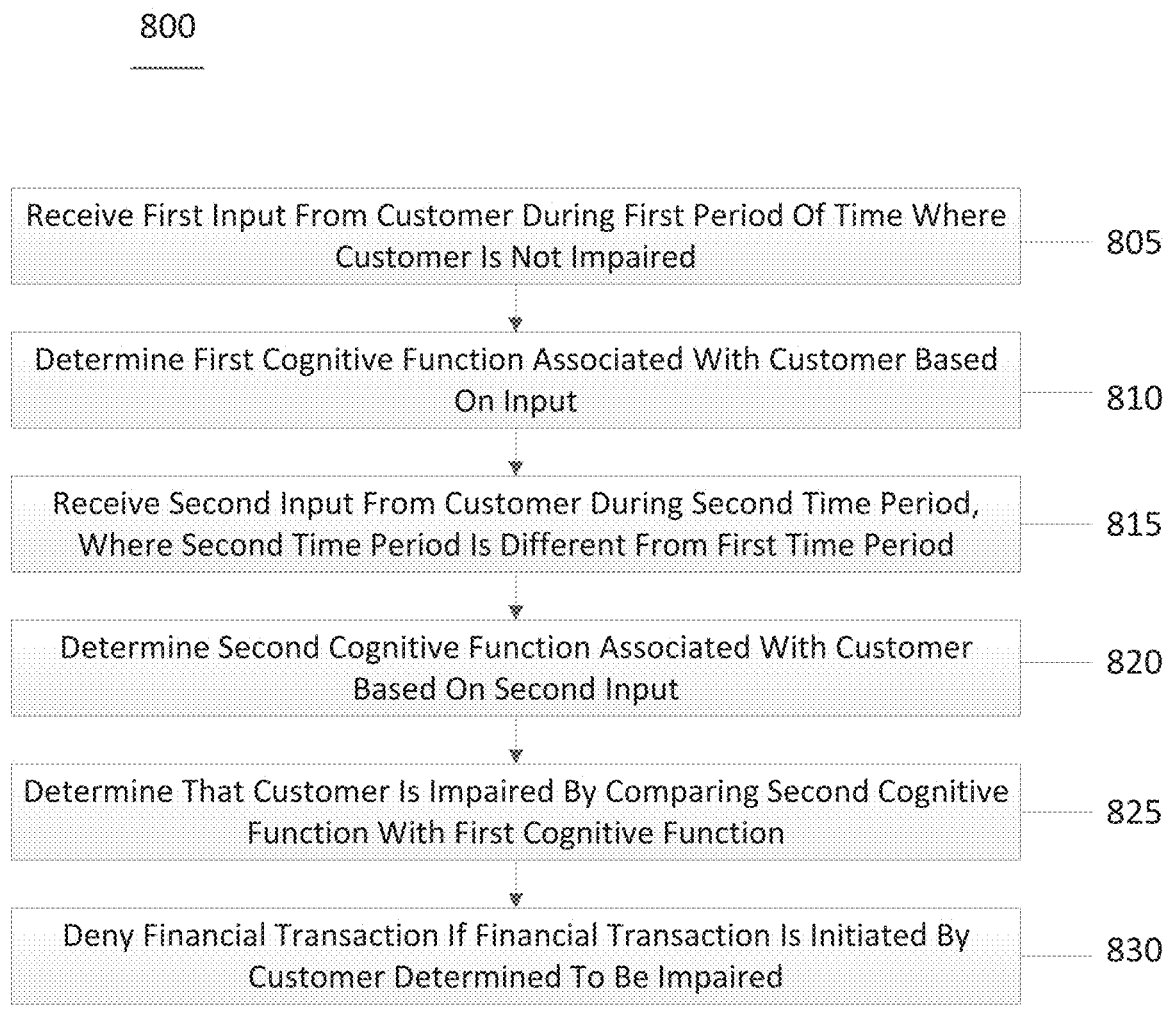
Figure 9:
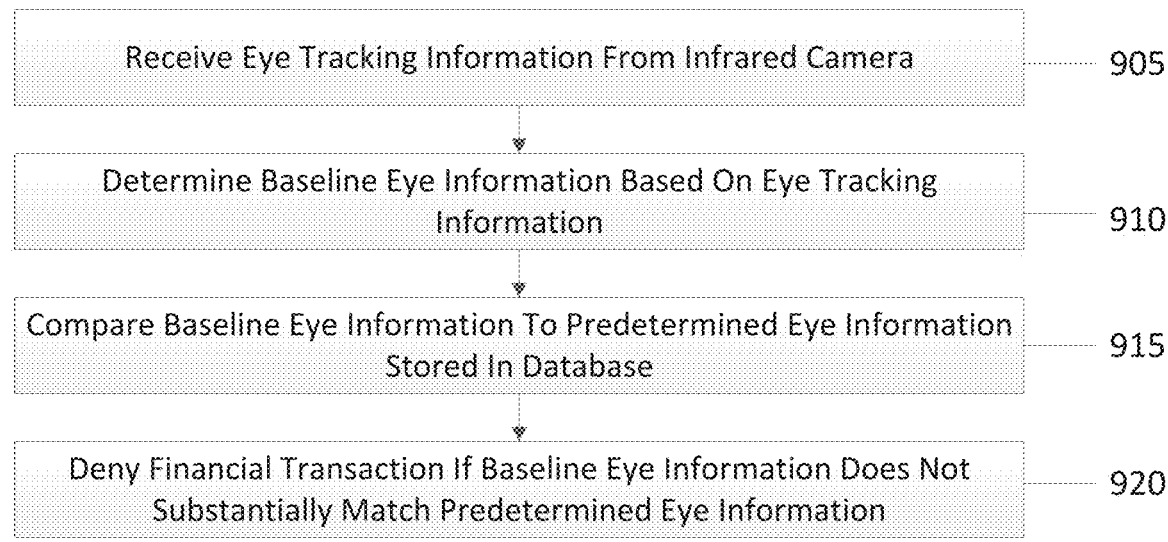

FIGS. 7, 8, and 9 are exemplary flow diagrams of exemplary methods 700, 800, and 900, respectively, for performing procedures according to an exemplary embodiment of the present disclosure.

As shown in FIG. 7, at procedure 705, a particular time period can received from the customer. At procedure 710, a baseline cognitive function can be generated or determined for the customer. At 715, information related to a financial transaction can be received. At procedure 720, current biological information can be received from the customer. At procedure 725, an impairment can be determined by comparing the baseline biological function to the current biological information. At procedure 730, the transaction can be approved or denied based on the impairment. At procedure 735, the transaction can be automatically denied if it is initiated within a particular time period, which can be set by the customer. At procedure 740, the transaction can be automatically denied if it is over a particular amount. At procedure 745, information related to the financial transaction can be provided to the customer after the transaction impairment has ended. At procedure 750, the financial transaction can be initiated based on an approval from the customer after the transaction impairment has ended.

As shown in FIG. 8, at procedure 805, a first input can be received from the customer during a first period of time where the customer is not impaired. At procedure 810, a first cognitive function associated with the customer can be determined based on the input. At procedure 815, a second input from the customer can be received during a second time period, where the second time period is different from the first time period. At procedure 820, a second cognitive function associated with the customer can be determined based on the second input. At procedure 825, a determination can be made as to whether the customer is impaired by comparing the second cognitive function with the first cognitive function. At procedure 830, a financial transaction can be denied if the financial transaction is initiated by the customer, if the customer is determined to be impaired.

Figure 10:
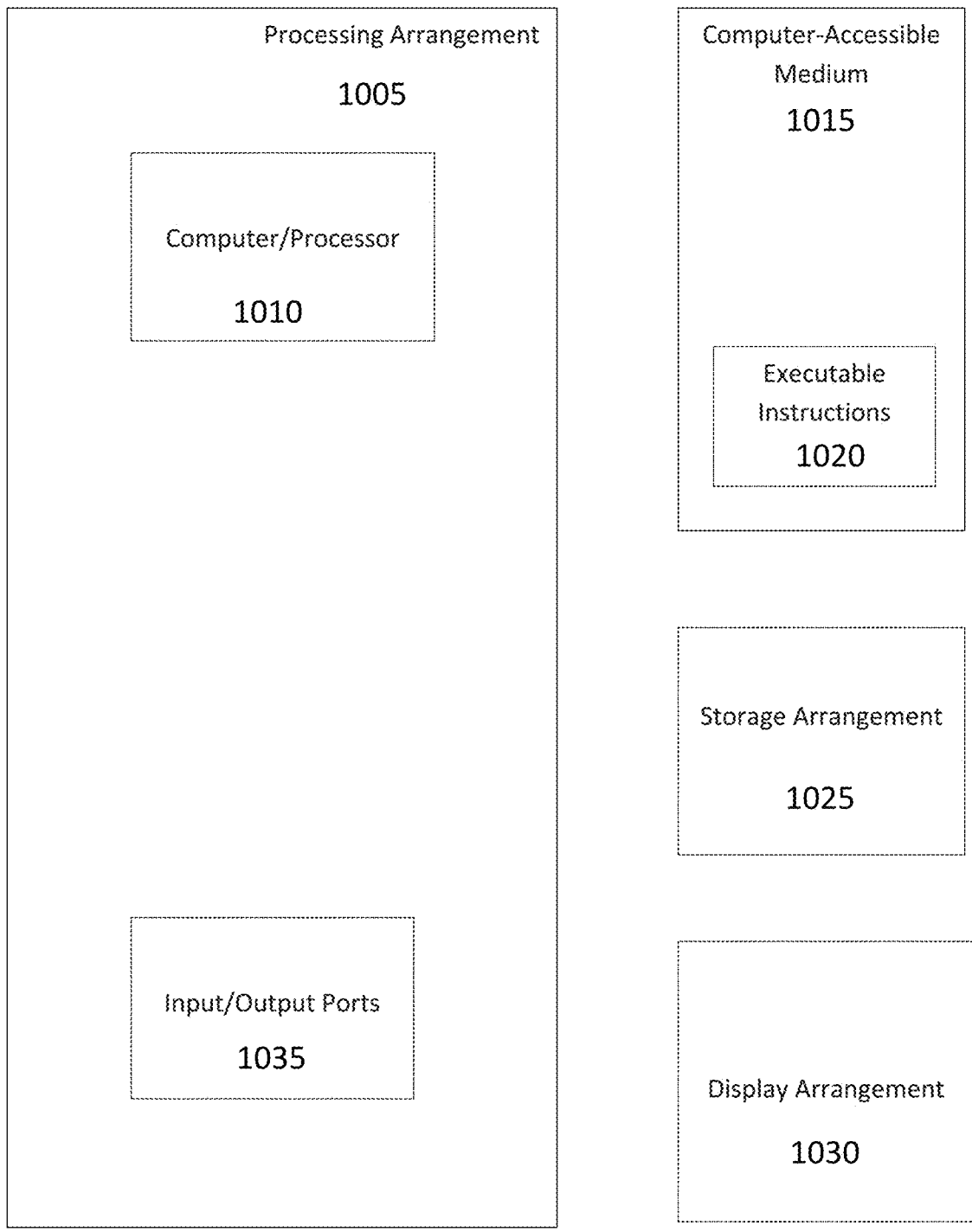
FIG. 10 is an illustration of an exemplary block diagram of an exemplary system in accordance with certain exemplary embodiments of the present disclosure.

As shown in FIG. 9, at procedure 905, eye tracking information can be received from an infrared camera. At procedure 910, a baseline eye information can be determined based on the eye tracking information. At procedure 915, the baseline eye information can be compared to a predetermined eye information stored in a database. At procedure 920, a financial transaction can be denied if the baseline eye information does not substantially match the predetermined eye information FIG. 10 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1005. Such processing/computing arrangement 1005 can be, for example entirely or a part of, or include, but not limited to, a computer/processor 1010 that can include, for example one or more microprocessors, and use instructions stored on a computer-accessible medium (e.g., RAM, ROM, hard drive, or other storage device).

As shown in FIG. 10, for example a computer-accessible medium 1015 (e.g., as described herein above, a storage device such as a hard disk, floppy disk, memory stick, CD-ROM, RAM, ROM, etc., or a collection thereof) can be provided (e.g., in communication with the processing arrangement 1005). The computer-accessible medium 1015 can contain executable instructions 1020 thereon. In addition or alternatively, a storage arrangement 1025 can be provided separately from the computer-accessible medium 1015, which can provide the instructions to the processing arrangement 1005 so as to configure the processing arrangement to execute certain exemplary procedures, processes, and methods, as described herein above, for example.

Further, the exemplary processing arrangement 1005 can be provided with or include an input/output ports 1035, which can include, for example a wired network, a wireless network, the internet, an intranet, a data collection probe, a sensor, etc. As shown in FIG. 10, the exemplary processing arrangement 1005 can be in communication with an exemplary display arrangement 1030, which, according to certain exemplary embodiments of the present disclosure, can be a touch-screen configured for inputting information to the processing arrangement in addition to outputting information from the processing arrangement, for example. Further, the exemplary display arrangement 1030 and/or a storage arrangement 1025 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for approving or denying at least one financial transaction initiated by at least one customer, wherein, when a system executes the instructions and the system comprises a processor, a sleep sensor and an infrared camera, the system is configured to perform procedures comprising:

causing, by the processor, the sleep sensor to determine a first sleep pattern of a user in an unimpaired state;
causing, by the processor, the infrared camera to determine first information on eye movement and pupil dilation of the user in the unimpaired state;
administering, by the processor, a cognitive test to the user to determine a first result the user obtained for the cognitive test in the unimpaired state;
applying, by the processor, a machine learning model to the first sleep pattern, the first information on eye movement and pupil dilation, and the first result the user obtained for the cognitive test;
determining, by the processor using the machine learning model, based on the first sleep pattern, the first information on eye movement and pupil dilation, and the first result the user obtained for the cognitive test, a baseline value for one or more cognitive functions associated with the user in the unimpaired state;
receiving, by the processor, information related to the at least one financial transaction;
causing the sleep sensor to determine a second sleep pattern of the user;
causing the infrared camera to determine second information on eye movement and pupil dilation of the user;
administering, by the processor, the cognitive test to the user to determine a second result the user obtained for the cognitive test;
applying, by the processor, the machine learning model to the first sleep pattern, the first information on eye movement and pupil dilation, the first result the user obtained for the cognitive test, the second sleep pattern, the second information on eye movement and pupil dilation, and the second result the user obtained for the cognitive test;
measuring, based on the machine learning model, a real-time value for the one or more cognitive functions for comparison with the corresponding baseline value;
determining, by the processor, an impairment state of the user based on a deviation of the real-time value from the corresponding baseline value exceeding a predetermined threshold; and
approving or denying, by the processor, the at least one financial transaction based on the impairment state of the user.

2. The computer-accessible medium of claim 1, wherein the system is configured to automatically deny the at least one transaction if the at least one transaction is initiated within a particular time period.

3. The computer-accessible medium of claim 2, wherein the system is further configured to receive the particular time period from the user.

4. The computer-accessible medium of claim 1, wherein the cognitive test comprises math and memory challenges.

5. The computer-accessible medium of claim 4, wherein the system is configured to determine the baseline value for the one or more cognitive functions associated with the user using at least one machine learning procedure.

6. The computer-accessible medium of claim 1, wherein the system is configured to receive further inputs via a computing device associated with the user.

7. The computer-accessible medium of claim 6, wherein the further inputs comprise at least one of a textual input, a tactile input, a vocal input, or a cursor input from at least one of a mouse or a trackpad associated with the computing device.

8. The computer-accessible medium of claim 7, wherein the textual input is from a keyboard.

9. The computer-accessible medium of claim 1, wherein the eye movement and pupil dilation information are measured with the infrared camera from one eye associated with the user.

10. The computer-accessible medium of claim 7, wherein the at least one of a textual input, a tactile input, a vocal input, or a cursor input correspond to a measurement of one or more motor skills of the user.

11. The computer-accessible medium of claim 1, wherein the system is further configured to:
provide information related to the at least one financial transaction to the user after an impairment state has ended; and
initiate the at least one financial transaction based on an approval from the user.

12. The computer-accessible medium of claim 1, wherein the system is configured to deny the at least one financial transaction if the at least one financial transaction is over a particular amount.

13. The computer-accessible medium of claim 1, wherein the at least one financial transaction is at least one card not present financial transaction.

14. A method executed by a system for implementing an impaired mode spending restrictions, wherein the system comprises a processor, a sleep sensor and an infrared camera, the method comprising:
causing, by the processor, the sleep sensor to determine a first sleep pattern of a user in an unimpaired state;
causing, by the processor, the infrared camera to determine first information on eye movement and pupil dilation of the user in the unimpaired state;
administering, by the processor, a cognitive test to the user to determine a first result the user obtained for the cognitive test in the unimpaired state;
applying, by the processor, a machine learning model to the first sleep pattern, the first information on eye movement and pupil dilation, and the first result the user obtained for the cognitive test;
determining, by the processor using the machine learning model, based on the first sleep pattern, the first information on eye movement and pupil dilation, and the first result the user obtained for the cognitive test, a baseline value for one or more cognitive functions associated with the user in the unimpaired state;
receiving, by the processor, information related to the at least one financial transaction;
causing, by the processor, the sleep sensor to determine a second sleep pattern of the user;
causing, by the processor, the infrared camera to determine second information on eye movement and pupil dilation of the user;
administering, by the processor, the cognitive test to the user to determine a second result the user obtained for the cognitive test;
applying, by the processor, the machine learning model to the first sleep pattern, the first information on eye movement and pupil dilation, the first result the user obtained for the cognitive test, the second sleep pattern, the second information on eye movement and pupil dilation, and the second result the user obtained for the cognitive test;
measuring, based on the machine learning model, a real-time value for the one or more cognitive functions for comparison with the corresponding baseline value;

determining, by the processor, an impairment state of the user based on a deviation of the real-time value from the corresponding baseline value exceeding a pre-determined threshold; and approving or denying, by the processor, the at least one financial transaction based on the impairment state of the user.

15. The method of claim 14, further comprising denying the at least one financial transaction if the at least one financial transaction is initiated by the user if the user is determined to be impaired.

16. The method of claim 15, further comprising denying the at least one financial transaction only if the at least one financial transaction is over a particular amount.

17. The method of claim 14, further comprising:

receiving, by the processor from a user device associated with the user, at least one first input during a first period of time where the user is in the unimpaired state, the at least one first input comprising one of a first textual input from a keyboard and a first cursor input from a track pad; and determining, by the processor using the machine learning model, based on the at least one first input, the baseline value for one or more cognitive functions associated with the user in the unimpaired state.

18. The method of claim 14, wherein the processor is further configured to:

receive, from a user device associated with the user, at least one first input during a first period of time where the user is in the unimpaired state, the at least one first input comprising one of a first textual input from a keyboard and a first cursor input from a track pad;

determine, using the machine learning model, based on the at least one first input, the baseline value for one or more cognitive functions associated with the user in the unimpaired state;

receive, from the user device associated with the user, at least one second input during a second time period, the at least one second input comprising one of a second textual input from the keyboard and a second cursor input from the track pad, wherein the second time period is different from the first time period, and apply the machine learning model to the at least one first input and the at least one second input.

19. The method of claim 18, wherein the processor is further configured to:

measure, based on the machine learning model, the real-time value for the one or more cognitive functions for comparison with the corresponding baseline value; and determine the impairment state of the user based on the deviation of the real-time value from the corresponding baseline value exceeding the pre-determined threshold.

20. A system for implementing an impaired mode spending restrictions, comprising:

a processor;

a sleep sensor configured to determine a first sleep pattern of a user in an unimpaired state;

an infrared light source configured to generate a first infrared light and provide the first infrared light to at least one eye of the user in the unimpaired state; and an infrared camera configured to receive a reflected infrared light from the at least one eye that is based on the first infrared light to determine first information on eye movement and pupil dilation of the user in the unimpaired state, wherein:

the processor is configured to:

administer a cognitive test to the user to determine a first result the user obtained for the cognitive test in the unimpaired state;

apply a machine learning model to the first sleep pattern, the first information on eye movement and pupil dilation, and the first result the user obtained for the cognitive test;

determine, using the machine learning model, based on the first sleep pattern, the first information on eye movement and pupil dilation, and the first result the user obtained for the cognitive test, a baseline value for one or more cognitive functions associated with the user in the unimpaired state;

receive information related to the at least one financial transaction;

cause the sleep sensor to determine a second sleep pattern of the user;

cause the infrared camera to determine second information on eye movement and pupil dilation of the user;

administer the cognitive test to the user to determine a second result the user obtained for the cognitive test;

apply the machine learning model to the first sleep pattern, the first information on eye movement and pupil dilation, the first result the user obtained for the cognitive test, the second sleep pattern, the second information on eye movement and pupil dilation, and the second result the user obtained for the cognitive test;

measure, based on the machine learning model, a real-time value for the one or more cognitive functions for comparison with the corresponding baseline value;

determine an impairment state of the user based on a deviation of the real-time value from the corresponding baseline value exceeding a pre-determined threshold; and approve or deny the at least one financial transaction based on the impairment state of the user.

* * * * *